United States Patent
O'Connell et al.

(10) Patent No.: US 6,641,027 B2
(45) Date of Patent: Nov. 4, 2003

(54) METHOD OF CONNECTING ELECTRIC LEADS TO BATTERY TABS

(75) Inventors: Ronald V. O'Connell, Harpersfield, OH (US); Mark L. Daroux, Cleveland Heights, OH (US); Shawn E. Thomas, Eastlake, OH (US); Xuekun Xing, Richmond Heights, OH (US)

(73) Assignee: NGK Spark Plug Co., Ltd. (JP)

( * ) Notice: Subject to any disclaimer, the term of this patent is extended or adjusted under 35 U.S.C. 154(b) by 0 days.

(21) Appl. No.: 10/023,511

(22) Filed: Dec. 18, 2001

(65) Prior Publication Data

US 2003/0111512 A1 Jun. 19, 2003

(51) Int. Cl.[7] ............................................... B23K 20/10
(52) U.S. Cl. ..................... 228/110.1; 228/212; 228/1.1; 228/44.7; 228/58; 429/211
(58) Field of Search ............................... 228/110.1, 1.1, 228/212, 213, 44.7, 156, 73.1, 73.2, 58; 429/211, 161, 178, 127

(56) References Cited

U.S. PATENT DOCUMENTS

| | | |
|---|---|---|
| 3,566,203 A | 2/1971 | Edmund et al. ............. 317/230 |
| 3,717,842 A | 2/1973 | Douglas, Jr. ................. 339/275 |
| 3,909,300 A | 9/1975 | Schenk, Jr. et al. ..... 136/134 R |
| 4,422,494 A | 12/1983 | Chaffin et al. ................. 164/80 |
| 4,545,119 A | 10/1985 | Tanazawa ..................... 29/839 |
| 4,580,713 A | 4/1986 | Sekibata et al. ............. 228/111 |
| 4,860,433 A | 8/1989 | Miura ........................... 29/605 |
| 4,860,445 A | 8/1989 | Jones ............................ 29/842 |
| 4,893,742 A | 1/1990 | Bullock ...................... 228/110 |
| 5,223,063 A | 6/1993 | Yamazaki et al. .......... 156/73.2 |
| 5,361,491 A | 11/1994 | Oomachi et al. .............. 29/852 |
| 5,378,560 A | 1/1995 | Tomiyama ................... 429/217 |
| 5,449,575 A | 9/1995 | Moulton ...................... 429/179 |
| 5,658,688 A | 8/1997 | Jolson ......................... 429/194 |
| 5,660,319 A | 8/1997 | Falcone et al. ........... 228/110.1 |
| 5,705,292 A * | 1/1998 | Yukita et al. ................ 429/137 |
| 5,735,449 A | 4/1998 | Magni ..................... 228/180.5 |
| 5,773,164 A * | 6/1998 | Venkatesan et al. ......... 429/161 |
| 5,908,151 A | 6/1999 | Elias ....................... 228/110.1 |
| 6,056,185 A | 5/2000 | Daroux et al. ........... 228/110.1 |
| 6,335,110 B1 * | 1/2002 | Chang et al. ................... 429/7 |
| 6,515,449 B1 * | 2/2003 | Thomas et al. .............. 320/107 |

* cited by examiner

Primary Examiner—M. Alexandra Elve
Assistant Examiner—Len Tran
(74) Attorney, Agent, or Firm—Mark Kusner; Michael A. Jaffe

(57) ABSTRACT

A method of connecting a generally flat battery lead to at least one flat current collector of a polymer battery, comprising the steps of: bending a generally planar lead about at least one generally planar current collector tab to form a layered area, wherein at least one planar tab is disposed between planar portions of the lead with the lead wrapped around one edge of at least one tab; clamping the layered area between two weld fixtures of an ultrasonic welder; and vibrating the weld fixtures to ultrasonically weld together the battery lead and at least one current collector tab.

5 Claims, 3 Drawing Sheets

METHOD OF CONNECTING ELECTRIC LEADS TO BATTERY TABS

FIELD OF THE INVENTION

The present invention relates generally to methods of connecting batteries to electronic components, and more particularly, to a method of connecting battery leads to a current collector of a polymer electrolyte cell or battery.

BACKGROUND OF THE INVENTION

Improvements in microelectronics have increased the demand for electrolyte battery cells that can be directly incorporated into electronic devices so as to produce a portable, self-contained product. Some of these products are designed such that the electrolyte battery cell may be attached directly to an electronic circuit within the product.

The leads of such batteries are typically flat strips of copper that are attached to current connectors of the cell by conventional techniques, such as resistance welding or soldering. The battery leads are often connected to short tabs that extend from the current collectors of the battery cell. Such tabs are typically formed of copper or aluminum mesh or screen. Making connections between mesh tabs and flat, metallic strips by welding or soldering is particularly difficult because the connection is made very near to the layered components forming the cell.

U.S. Pat. No. 6,056,185 to Daroux et al. entitled: METHOD OF CONNECTING BATTERIES TO ELECTRONIC CIRCUITS, discloses attaching a metal lead to a current collector tab of a polymer battery by an ultrasonic welding process. The disclosed process includes positioning a collector tab extending from a polymer electrolyte battery onto one side of a flexible, metal lead and then clamping and ultrasonically welding the metal lead to the current collector.

In some applications, the aforementioned one side, surface-to-surface weld is not sufficient to prevent peeling and/or separation of the metal battery lead from the flexible metal connector.

The present invention provides an improved method of connecting copper or aluminum leads of a battery to current collectors of a polymer electrolytic cell.

SUMMARY OF THE INVENTION

In accordance with a preferred embodiment of the present invention, there is provided a method of connecting a generally flat battery lead to a current collector of a polymer battery, comprising the steps of:

bending a generally planar lead about at least one generally planar current collector tab to form a layered area, wherein at least one planar tab is disposed between planar portions of the lead with the lead wrapped around one edge of at least one tab;

clamping the layered area between two weld fixtures of an ultrasonic welder; and vibrating the weld fixtures to ultrasonically weld together the battery lead and at least one current collector.

It is an object of the present invention to provide a method for attaching generally flat, metallic leads to a current collector tab of electrochemical cells or batteries, especially Li-ion batteries, and most especially Li-ion-polymer batteries.

Another object of the present invention is to provide a method as described above for securing copper or aluminum lead to a current collector.

Another object of the present invention is to provide a method as described above that does not require special coating or plating steps.

A still further object of the present invention is to provide a method as described above that utilizes ultrasonic welding to join a flat, metallic lead to a current collector.

A still further object of the present invention is to provide a method as described above that provides better connection between a flat, metallic lead and a current collector tab.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in, detail in the specification and illustrated in the accompanying drawings which form a part hereof, and wherein.

DETAILED DESCRIPTION OF PREFERRED EMBODIMENT

Broadly stated, the present invention relates to a method of attaching a lead to a current collector of a polymer electrolyte cell, such as a lithium-ion or a lithium-ion polymer battery cell. Such cells typically include copper or aluminum current collectors. The current collectors are typically formed from a sheet of a metal mesh, metal grid or perforated metal, and include a flat tab that extends from the battery cell.

Figure 1:
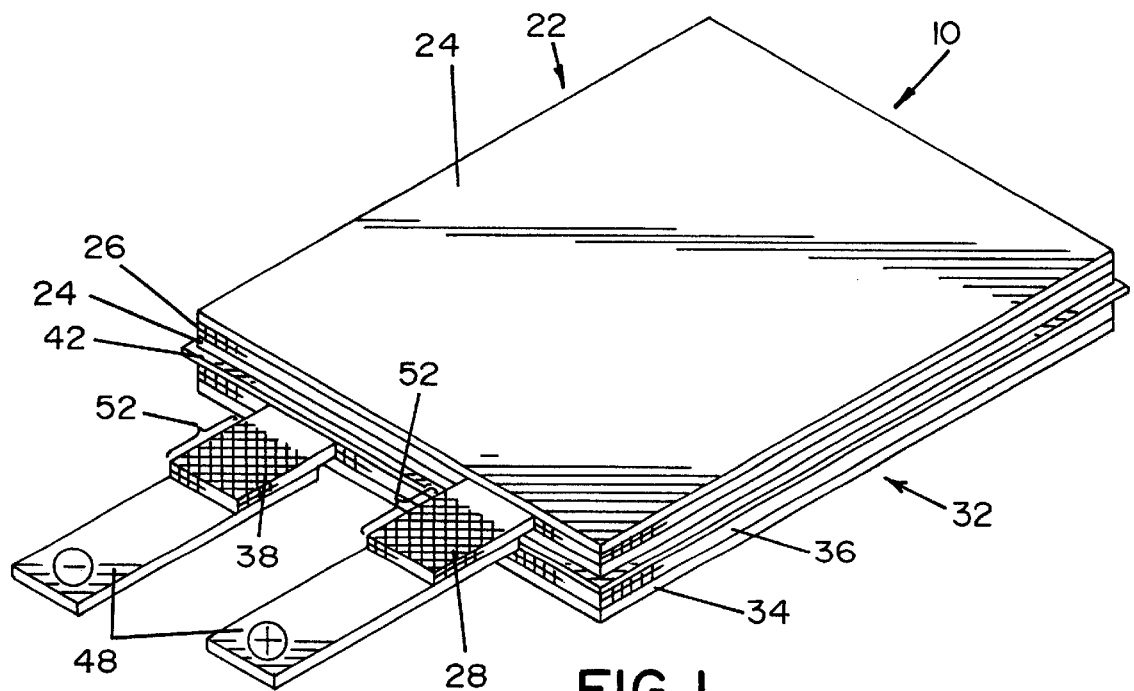
FIG. 1 is a perspective view of an electrolyte battery cell having current collectors that have leads connected to one side thereof, illustrating a known method of attachment.
Figure 2:
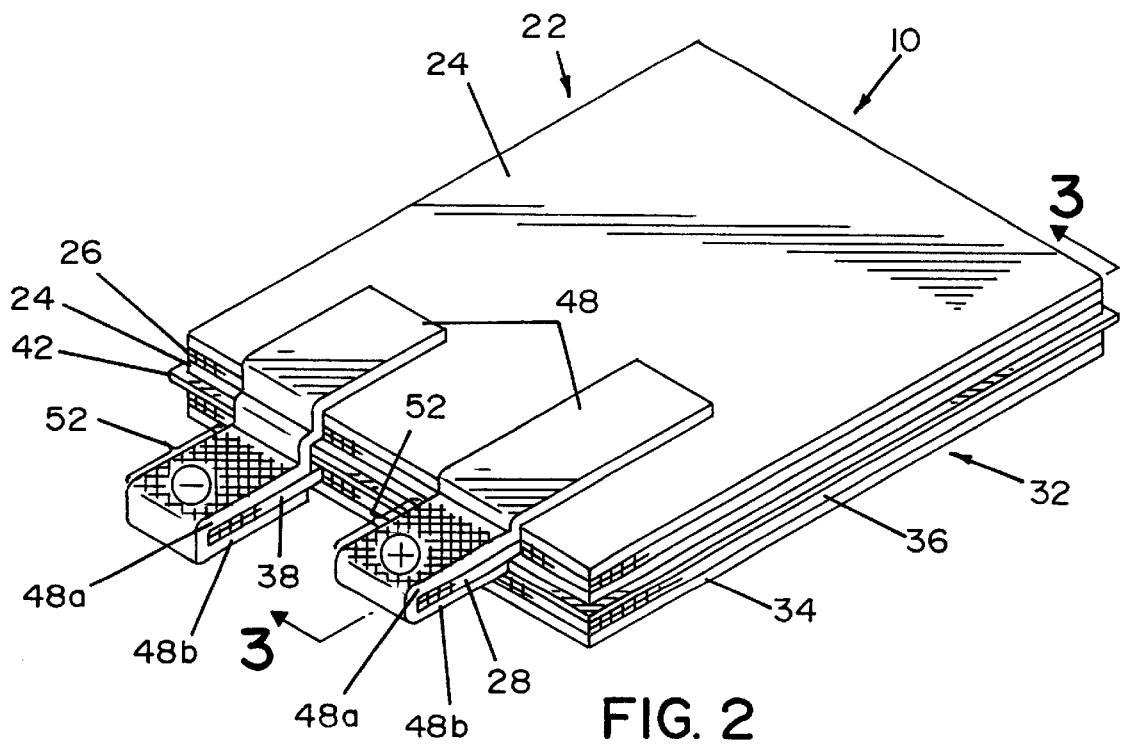
FIG. 2 is a perspective view of an electrolyte battery cell having battery leads connected to connector strips in accordance with a preferred embodiment of the present invention.

Referring now to the drawings wherein the showings are for the purpose of illustrating the preferred embodiments of the invention only, and not for the purpose of limiting same, FIG. 1 shows an electrolyte battery cell 10. Cell 10 is comprised of a cathode section 22 and an anode section 32, best seen FIG. 2. Each cathode section 22 is comprised of two layers 24 of a cathode film. A current collector 26 formed of a metal screen or mesh is provided between cathode layers 24. Current collector 26 includes an outward extending tab or strip 28. Current collector 26 has a thickness between about 10 $\mu$m to 50 $\mu$m. (In the drawings, the thickness of the respective components forming cell 10 are exaggerated for the purpose of illustration).

Anode section 32 is comprised of two layers 34 of an anode film having a current collector 36 disposed therebetween. Current collector 36 includes an outward extending tab or strip 38 that defines the negative lead of cell 10. Current collector 36 has a thickness between about 10 μm to 50 μm.

Between anode section 32 and cathode section 22, a separator film 42 is disposed.

Tabs 28, 38 are generally flat and formed from the same metal mesh, metal screening or perforated metal forming the anode and cathode current collectors 26, 36, as is conventionally known. Leads 48 are attached to tabs 28, 38. Leads 48 may be any type of generally flat, metallic connector that would connect to current collector tabs 28, 38. In the embodiment shown, leads 48 are shown as flat, metallic strips. Leads 48 may be formed of copper, aluminum, nickel or may be formed of a metallized polymer, typically copper on polyimide. Leads 48 may be attached to tabs 28, 38 by techniques such as resistant welding or soldering. U.S. Pat. No. 6,056,185 to Daroux entitled: METHOD OF CONNECTING BATTERIES TO ELECTRONIC CIRCUITS, discloses an ultrasonic welding technique for welding metal leads to metal connectors. The disclosure of U.S. Pat. No. 6,056,185 is hereby expressly incorporated herein by reference.

FIG. 1 shows a conventional way of connecting leads 48 to current collector tabs 28, 38, wherein a lead 48 overlaps one side of a current collector tab 28 or 38. In this position, leads 48 may be ultrasonically welded to each tab 28, 38 in a manner as disclosed in the above-identified U.S. patent to form weld areas 52. In this type of attachment, one face of each current collector tab 28, 38 abuts one face of each lead 48. With leads 48 attached to current collector tabs 28, 38, as shown in FIG. 1, cell 10 would then be inserted into a package (not shown) that encloses and protects cell 10. The packaging is typically comprised of a laminate material, and weld areas 52 are typically disposed within the packaging.

Figure 3:
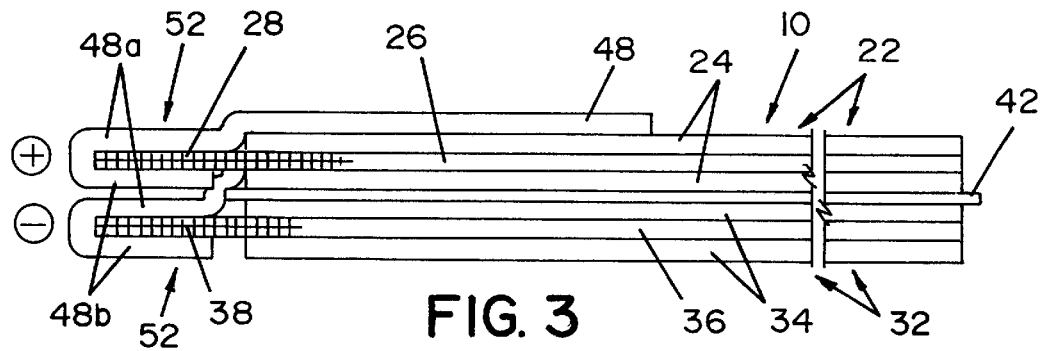
FIG. 3 is a side elevational view of the cell shown in FIG. 2.
Figure 4:
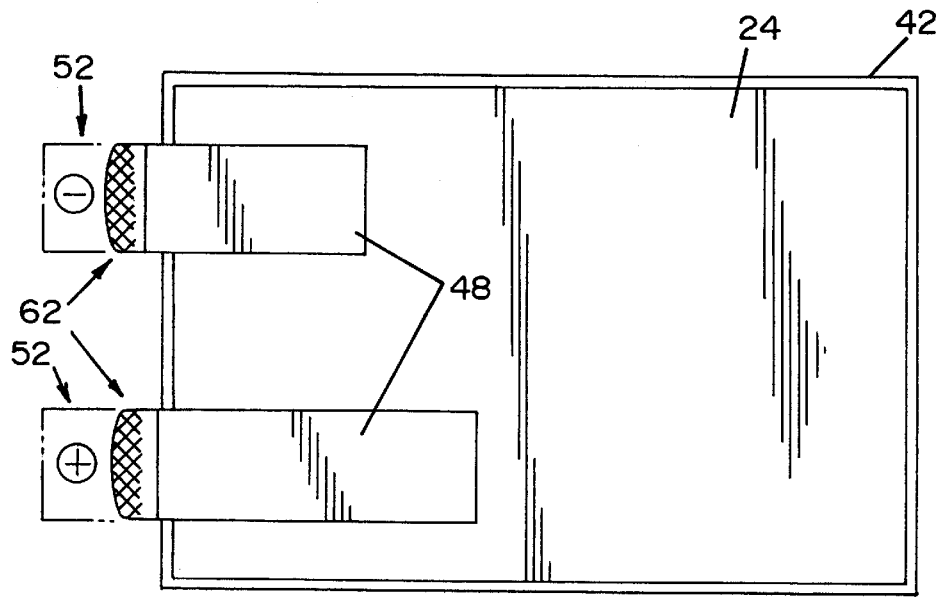
FIG. 4 is a top, plan view of an electrolyte cell showing trimmed leads, illustrating another embodiment of the present invention.

Referring to FIGS. 3 and 4, battery 10 is shown having leads 48 attached to current collector tabs 28, 38 in accordance with the present invention. In the embodiment shown, leads 48 are bent around and over tabs 28, 38, such that tabs 28, 38 are essentially sandwiched between portions of leads 48. In this respect, leads 48 and tabs 28, 38 form a layered structure with tabs 28, 38 disposed between portions 48a, 48b of leads 48. In this configuration, both sides of tabs 28, 38 are covered by and engage leads 48, thereby providing the maximum contacting surface area between tabs 28, 38 and leads 48. In the embodiment shown, the entire surface area of the exposed portion of tabs 28, 38 engage a power pick-up structure, i.e., leads 48. This maximum surface area contact between current collector tabs 28, 38 and leads 48 improve the current transfer efficiency of the connection. The processes heretofore described provide better contact between leads 48 and current collector tabs 28, 38. As indicated above, current collector tabs 28, 38 are typically formed of a mesh, screen or perforated metal. By attaching leads 48 onto both surfaces of collector tabs 28, 38, a fairly rigid, three-layered structure, i.e., weld areas 52, results. As compared to a single or even a double layer of metal, the three-layered structure is fairly rigid.

Figure 5:
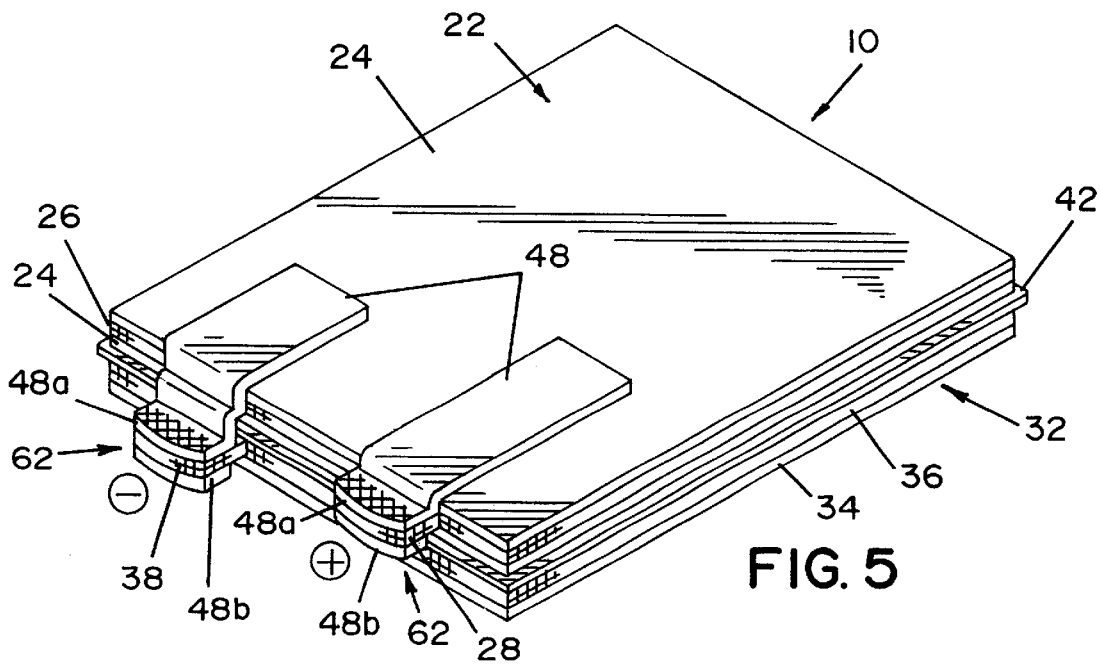
FIG. 5 is a perspective view of the cell shown in FIG. 4.
Figure 6:
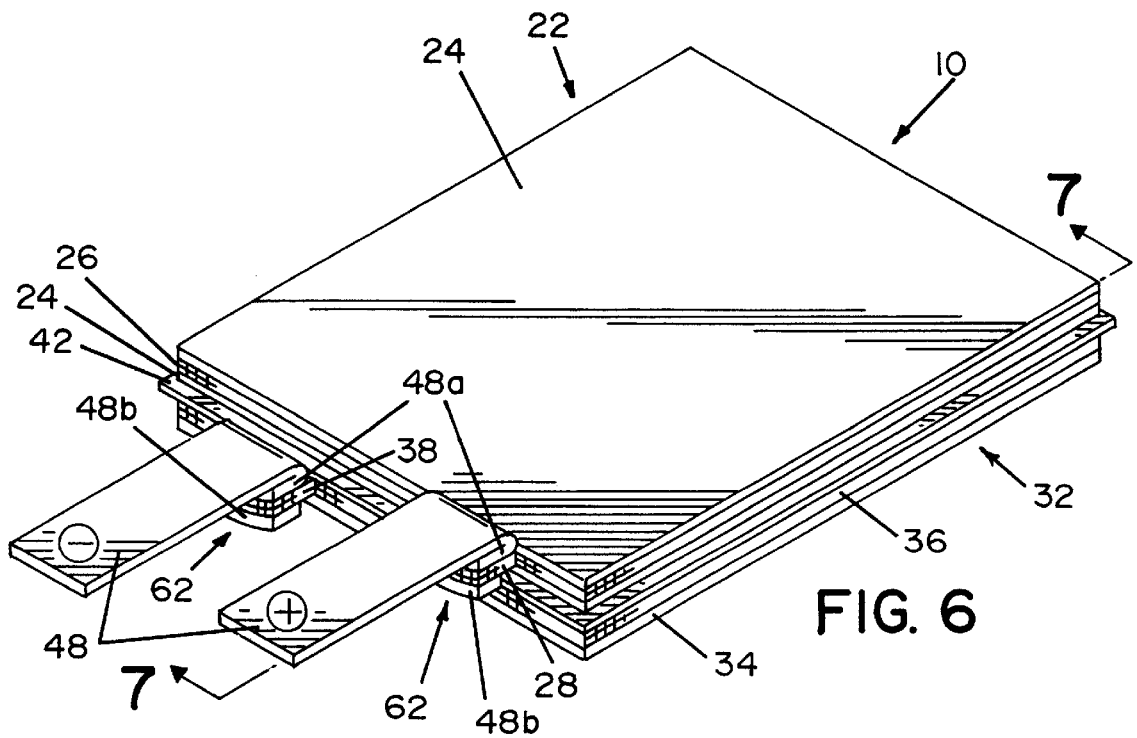
FIG. 6 is a perspective view of the electrolyte cell shown in FIG. 5 with the battery leads bent over to extend outwardly from the cell.
Figure 7:
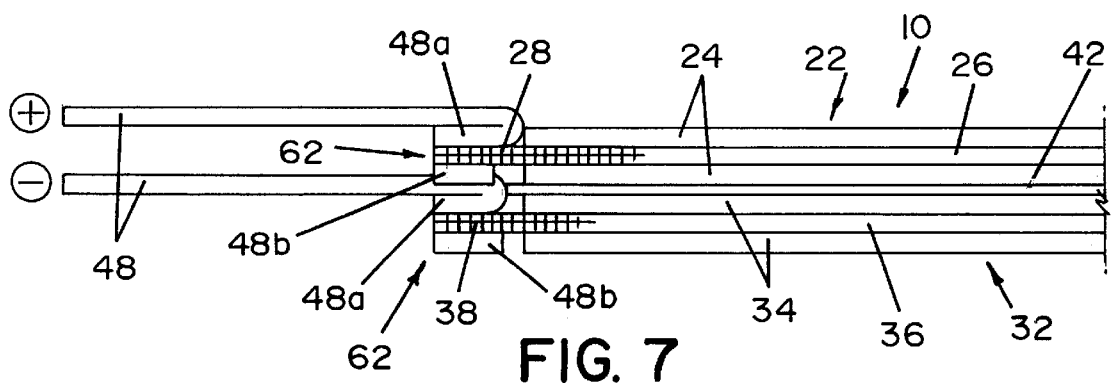
FIG. 7 is a sectional view taken along lines 7—7 of FIG. 6.

Referring now to FIGS. 4–7, weld areas 52, formed as heretofore described, are further machined to form rigid poles or connectors 62, hereinafter referred to as "nuggets," at the ends of cell 10. It has been found that the weld areas 52 may be machined, typically by die stamping, to form rounded nuggets 62. Nuggets 62 are still connected to leads 48, as best illustrated in FIGS. 5 and 7. Such a configuration provides a battery having rigid connections to cell 10 and at the same time provides a smaller weld area 52 to be packaged.

FIGS. 6 and 7 show cell 10 with leads 48 bent over nugget 62 into position with leads 48 projecting from cell 10, in a position for packaging cell 10. As best seen in FIG. 7, leads 48 are bent over onto nugget 62. As also seen in FIG. 4, the length of nugget 62 is less than the length of original weld area 52. By reducing the overall length of weld areas 52, a smaller, tighter package (not shown) around cell 10 may be provided.

Figure 8:
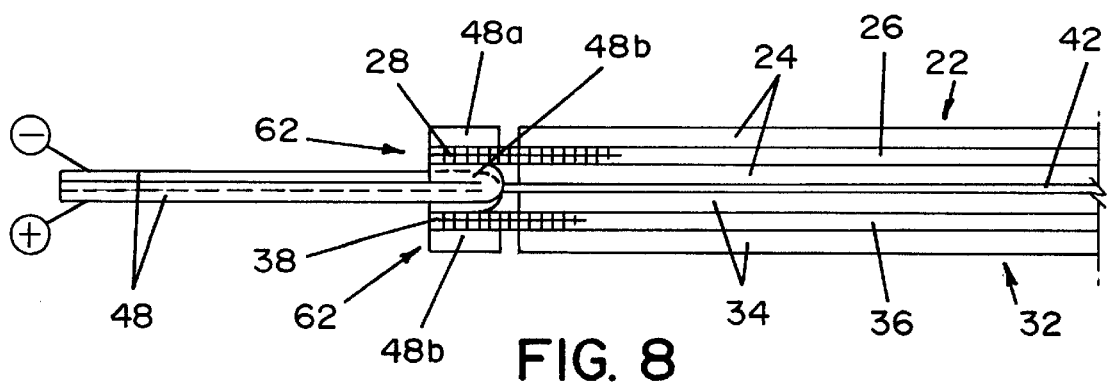
FIG. 8 is a sectional view showing an alternate embodiment of the present invention.

FIG. 8 is a sectional view of cell 10, wherein lead 48 attached to cathode current collector tab 28 is attached so that lead 48 is disposed on the bottom of current collector tab 28. In this orientation, both leads 48 are more closely disposed in the same plane as they extend from battery cell 10. This more coplanar orientation of leads 48 makes sealing a packaging laminate around leads 48 easier, as the edges of the packaging laminate are more closely and evenly aligned.

The invention shall now be described in the following Examples.

EXAMPLE I

Table I shows the operating parameters for connecting a copper cathode current collector tab 28 to a copper lead 48. The end of lead 48 and current collector tab 28 are chemically cleaned to improve welding. In this respect, as will be appreciated by those skilled in the art, the ease of welding may be enhanced, or the severity of the welding conditions required reduced, if one or both of the surfaces to be welded are, in any combination, chemically and/or mechanically treated to clean, degrease or mechanically roughen the surface. Lead 48 is wrapped, i.e., bent, around current collector tab 28, as shown in FIGS. 3 and 4. An AMTECH ultrasonic welder is used to connect lead 48 to a current collector tab 28 or 38. The settings of the ultrasonic welder for welding a single current collector tab 28 to a copper lead 48 are as follows:

TABLE I

| Copper Current Collector Tab 28 to Copper Lead 48 | |
|---|---|
| Energy | 120 joules |
| Force | 15 psi |
| Pressure | 15 psi |
| Amplitude | 4 microns |

EXAMPLE II

The following Table shows the operating parameters of the same AMTECH ultrasonic welder when used to attach a single aluminum current collector tab 38 to a copper lead 48. As in Example II, the ends of the respective leads are preferably cleaned to improve welding. Lead 48 is wrapped, i.e., bent, around current collector tab 38, as shown in FIGS. 3 and 4. The following settings are used to attach a single aluminum current collector tab 38 to a copper lead 48:

TABLE II

| Aluminum Current Collector Tab 38 to Copper Lead 48 | |
|---|---|
| Energy | 30 joules |
| Force | 15 psi |
| Pressure | 15 psi |
| Amplitude | 3 microns |

EXAMPLE III

The following Table shows the operating parameters of the same AMTECH ultrasonic welder when used to attach a single copper current collector tab 38 to a nickel lead 48. As in Examples I and II, the ends of the respective leads are preferably cleaned to improve welding. Lead 48 is wrapped, i.e., bent, around current collector tab 38, as shown in FIGS. 3 and 4. The following settings are used to attach a single copper current collector tab 38 to a nickel lead 48:

TABLE III

| Copper Current Collector Tab 38 to Copper Lead 48 | |
| --- | --- |
| Energy | 50 joules |
| Force | 10 psi |
| Pressure | 15 psi |
| Amplitude | 2 microns |

The foregoing procedures successfully welded the respective metal leads to the identified current collectors. In the foregoing Examples, copper and nickel leads 48 are each welded to a single current collector tab formed of copper, and an aluminum lead 48 is welded to a single current collector tab formed of aluminum. As will be appreciated, some battery configurations may require joining a plurality of current collector tabs to a single battery lead 48. Multiple current collector tabs may be joined to a single battery lead by the method as heretofore described.

The foregoing description is of preferred embodiments of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method of connecting a generally flat battery lead to at least one flat current collector of a polymer battery, comprising the steps of:

bending a generally planar lead about at least one generally planar current collector tab to form a layered area, wherein said at least one planar tab is disposed between planar portions of said lead with said lead wrapped around one edge of said at least one tab and with said lead disposed on opposite sides of said at least one tab;

clamping said layered area between two weld fixtures of an ultrasonic welder;

vibrating said weld fixtures to ultrasonically weld together said battery lead and said at least one current collector tab to form a multi-layered weld area comprised of said at least one tab and said planar portions of said lead; and trimming said weld area by removing said one edge of said at least one tab.

2. A method as defined in claim 1, wherein said weld area has a round edge projecting from said current collector.

3. A method as defined in claim 1, wherein said current collector is a metal mesh and said lead is a copper strip.

4. A method as defined in claim 1, wherein said lead is bent to be aligned with said at least one current collector tab.

5. A method as defined in claim 4, further comprising the step of packaging said current collector within a flexible package wherein said weld area is disposed within said package and said lead extends through said package.

* * * * *